Sept. 9, 1952          C. R. PATON          2,609,856
WHEEL
Filed Jan. 9, 1951
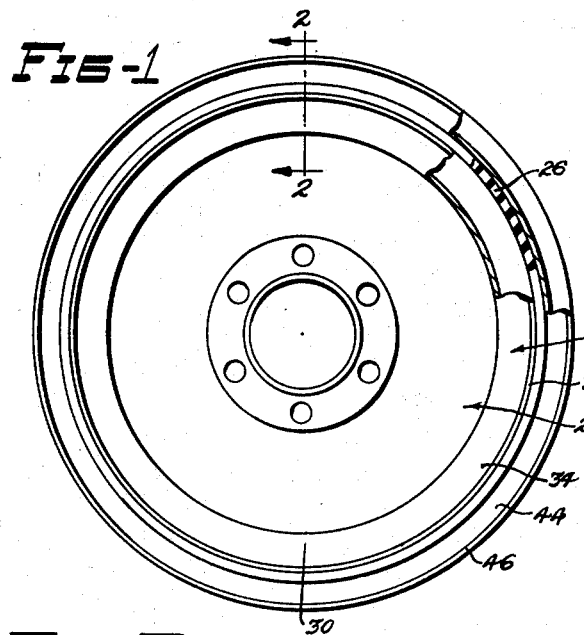
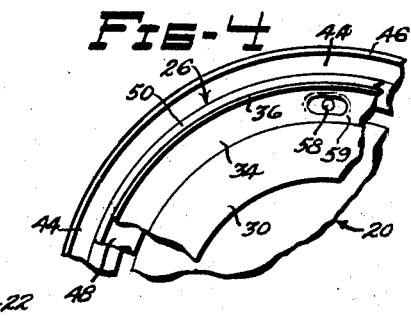
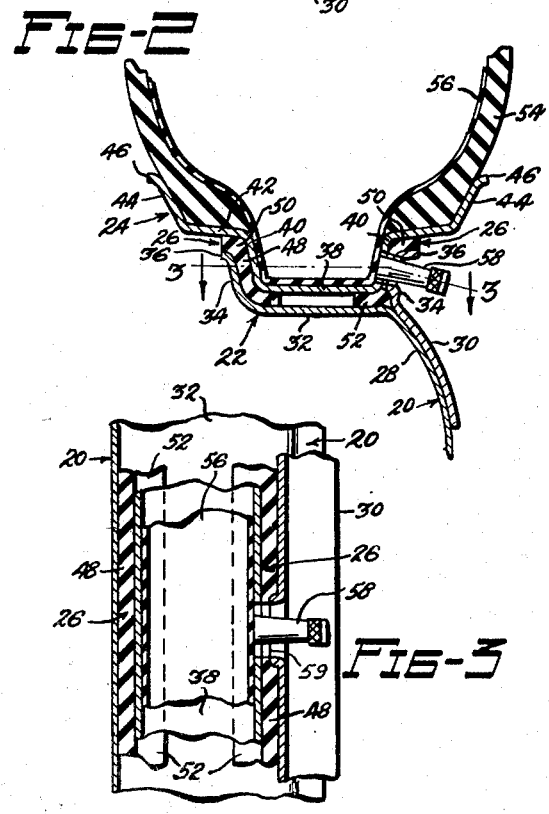
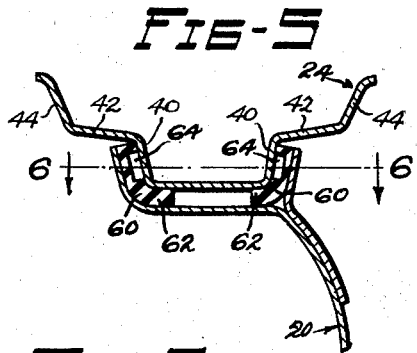
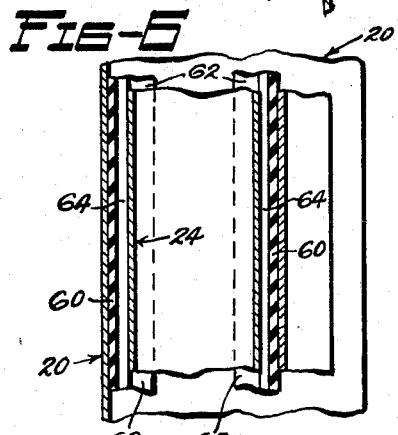
INVENTOR.
CLYDE R. PATON.
BY
Wallace P. Lamb
ATTORNEY Patented Sept. 9, 1952

2,609,856

UNITED STATES PATENT OFFICE 2,609,856

WHEEL

Clyde R. Paton, Birmingham, Mich.

Application January 9, 1951, Serial No. 205,148

4 Claims. (Cl. 152—50)

This invention relates generally to wheels and particularly to motor vehicle ground wheels.

One of the objects of my invention is to provide an improved vehicle wheel of composite construction including cushioning structural parts of the wheel arranged to effect a high degree of cushioning without departing from practical requirements of wheels.

Another object of the invention is to provide an improved vehicle wheel in which a vibration absorbing cushion, located between tire rim and wheel rim, is arranged such that the cushion meets requirements of structural firmness without sacrificing resilience beyond a degree of efficiency of vibration absorption for all practical purposes.

Another object of the invention is to provide an improved arrangement between a vibration absorbing cushion and rims of a wheel to reduce cost of such wheels and to make them otherwise practical from the manufacturing, as well as, the utility standpoint.

Another object of the invention resides in the provision of a wheel of the above-mentioned character in which the cushion is made in two separate rings or ribbons, located to oppose yieldingly both compression and shear forces and at the same time facilitate assembly.

Another object of the invention is to provide a wheel of the above-mentioned character in which the presence of the cushion does not require the provision of valve stems longer than standard length valve stems.

Another object of the invention is to insure against shearing off or damaging valve stems which might otherwise occur due to relative rotation of the wheel and tire rims allowed by the cushion upon application of wheel torque when a vehicle is suddenly started or stopped.

Other objects of the invention will become apparent from the following description of the wheel taken in connection with the accompanying drawing in which:

Fig. 1 is a side view of a motor vehicle wheel, embodying features of my invention;

Fig. 2 is a cross-sectional view of the wheel, taken along the line 2—2 of Fig. 1;

Fig. 3 is a horizontal, sectional view of the wheel, taken along the line 3—3 of Fig. 2;

Fig. 4 is a fragmentary view of the wheel showing a detail thereof;

Fig. 5 is a view similar to Fig. 2, of a modification of the wheel; and

Fig. 6 is a horizontal, sectional view of the modified wheel, taken along the line 6—6 of Fig. 5.

Referring to the drawing by characters of reference and first to Figs. 1 to 4 inclusive, the motor vehicle wheel shown comprises, in general, a wheel disc 20, a wheel rim 22, a tire retainer rim 24 and a pair of cushioning members 26 in the form of rubber rings or ribbons. The tire retainer rim 24 encircles the periphery of the wheel rim 22 in spaced relation thereto, and the pair of rubber rings 26 are interposed between and insulate or separate the rims from each other and absorb vibrations originating from road irregularities.

Any suitable design of wheel disc may be used in connection with my invention and, as a matter of fact, a spoke-type wheel may be used if desired. In the figures of the drawing, the wheel disc 20 shown is made of two main parts; to wit, a disc proper 28 and a disc flange 30. These parts may be welded or be otherwise secured together and are formed to co-operate in providing a so-called drop center rim 22. This drop center rim 22 has a central rim portion 32, oppositely disposed outwardly diverging or flared side flanges 34, and outturned marginal flange portions 36.

The tire retainer rim 24 is similar in cross section to the wheel rim 22 having a drop center configuration conforming or complementary to the drop center configuration of the wheel rim. For example, like the wheel rim 22, the tire retainer rim 24 has a central rim portion 38, outwardly diverging or flaring side flanges 40, and outturned flange portions 42. In addition, the tire retainer rim preferably has outer tire casing retainer flanges 44 which are usually edged by reinforcing side flanges 46.

In order to provide a practical shock cushioning wheel, i. e., one giving the desired cushioning effect without creating cost and assembly problems, I make the cushion in separate rings or ribbons which I arrange in spaced relation to each other between the rims to give two laterally spaced circular areas of contacting surface therewith so that the rubber may have desired structural firmness for weight support and yet will flow laterally sufficiently freely to absorb vibrations to a high degree of efficiency. By the term "structural firmness" is meant a rubber firmness capable of supporting its share of the weight of a motor vehicle without undue displacement.

The cushion rings 26 are arranged with respect to the rims such that portions 48 of the rings intermediate their opposite side edges are disposed between corresponding flared portions 34, 40 respectively of the wheel rim 22 and tire retainer rim 24. By this arrangement, it will be noted that the intermediate portion 48 of the rubber rings 26 are subjected to both compression and shear forces or a combination thereof. If will also be noted that I have arranged the rubber rings 26 so that outer marginal flange portions 50 and inner marginal flange portions 52 thereof are displaced by compression forces only. Thus, shear forces provide driving torque whereas compression forces largely support weight. In addition to absorbing vibrations by displacement, the outer marginal flanges 50 of the rubber rings seal the wheel against entrance of drit and moisture between the rims. If desired, the rubber rings 26 may be molded to have a cross-sectional shape complementary to the shapes of the rims at their outer edges. In order to limit relative rotation of rims 22, 24, I secure the rubber rings thereto. This may be done by any suitable and permanent cementing or bonding procedure.

A tire 54 is shown on the retainer rim 24 having an inner tube 56 provided with the usual valve stem 58. Aligning holes are provided in the sides or flared portions of the rims and in the intermediate portion of the adjacent outer ring 26 to receive the valve stem which projects laterally from the side of the wheel for ready access. In order to insure against shearing off the valve stem 58 by the rim retainer on sudden starting or stopping of a vericle having my cushioned wheel, I elongate the valve stem clearance holes substantially tangentially to the rims of the wheel to allow sufficient clearance for the relative rotation of the rims permitted by circumferential displacement of the cushioning rings. Also, in order to avoid need of a valve stem of a length longer than standard makes of stems, I omit the cushion around the stem and indent the side flange 34 of the wheel rim flanges 30, as at 59, to obtain substantially the same length of stem projecting from the wheel flange as in uncushioned wheels.

Referring now to the modification of Figs. 5 and 6, this wheel is similar to the above-described wheel and, therefore, like parts have been given like characters of reference to avoid unnecessary repetitious description. In the modification, the rubber rings are designated by the numeral 60 and differ from the rubber rings 26 in the omission of outer flange portions so that only inner flanges 62 are solely subjected to compression forces tending to displace the rubber vertically. Accordingly, the outer flanges are omitted from the wheel rim although they may be retained for reinforcing purposes, if desired. Also, in the modification, the surfaces of the rubber rings 60 are relieved, as at 64, to decrease the surface area of rubber engaging the flared portions or outer sides of the retainer rim.

From the foregoing description, it will now be understood that I have provided an improved motor vehicle road wheel by interposing a pair of laterally spaced rubber cushion rings between an inner wheel rim and an outer tire retainer rim. By providing separate rubber rings, laterally spaced apart adjacent the wheels opposite rim flanges, it will be understood that the two rings present narrow contact surface to the rims with the result that the rubber can be firm in the interest of weight supporting without loss of desired resilience and vibration absorbing qualities. Furthermore, the spacing of two rubber cushioning rings provides space therebetween for the displacement or flow of the rubber. In the construction of Fig. 2, the intermediate portion of the rubber rings is under both shear and compression forces; the outer flanges flow outwardly; and the inner flanges flow inwardly in absorbing shocks and cushioning vibrations. In Fig. 4 the cushioning is more sensitive than the construction of Fig. 2 in that less of the intermediate surfaces of the rings are in contact with the tire retainer rim and only the inner flanges are displaced. It is to be understood that the invention contemplates the use of rubber cushioning rings or rings made of rubberized material, or any suitable displaceable material having the desired cushioning characteristics.

While I have shown and described my invention in detail, it will be apparent to those skilled in the art that various modifications may be made therein without departing from the spirit of the invention or from the scope of the appended claims.

I claim:

1. In a vehicle wheel, a wheel rim having outwardly flaring opposite side flanges, a tire retainer rim encircling said wheel rim having outwardly flaring opposite side flanges substantially complementary to said first side flanges, a pair of separate cushioning rings interposed respectively between flaring flanges of said wheel rim and corresponding flaring flanges of said tire retainer rim to oppose both compression and shear forces, said cushioning rings being displaceable to allow limited rotary movement of said rims relative to each other, aligning apertures in one pair of said corresponding flanges to receive a valve stem and extended substantially tangentially to the radius of said rims to allow said limited movement without shearing the valve stem, and means securing said cushioning rings to said wheel rim and tire retainer rim.

2. In a vehicle wheel, a wheel rim having outwardly flaring opposite side flanges, a tire retainer rim encircling said wheel rim and having outwardly flaring opposite side flanges substantially complementary to said first flanges, a pair of separate rubber cushioning rings disposed respectively between flanges of said wheel rim and corresponding flanges of said tire retainer rim to oppose yieldingly both shear and compression forces, aligning apertures in said flanges and rubber cushioning rings to receive a valve stem, a depression in said tire retainer rim around the aperture therethrough, and means holding said rubber cushioning rings to said wheel rim and tire retainer rim.

3. In a vehicle wheel, a wheel rim having an outwardly flaring side flange, a tire retainer rim encircling said wheel rim having an outwardly flaring side flange substantially complementary to said first side flange, a displaceable cushioning ring interposed between said flanges to oppose both compression and shear forces, said cushioning ring being displaceable to allow limited rotary movement of said rims relative to each other, aligning apertures in said flanges to receive a valve stem and extended substantially tangentially to the radius of said rims to allow said limited movement without shearing the valve stem, and means securing said cushioning ring to said wheel rim and tire retainer rim.

4. In a vehicle wheel, a wheel rim having an outwardly flaring side flange, a tire retainer rim encircling said wheel rim having an outwardly flaring side flange substantially complementary to said first flange, a displaceable cushioning member interposed between said rim flanges for yieldably opposing both compression and shear forces, said cushioning ring being bonded to each said flange and being displaceable to allow limited rotary movement of said rims relative to each other, aligning apertures in said flanges to receive a valve stem and having clearance therewith to allow said limited movement without shearing the valve stem, and an inwardly directed offset portion in the tire retainer rim around the stem receiving aperture therein.

CLYDE R. PATON.

REFERENCES CITED

The following references are of record in the file of this patent:

UNITED STATES PATENTS

| Number | Name | Date |
|---|---|---|
| 1,247,988 | Mortier | Nov. 27, 1917 |
| 1,503,844 | Moody | Aug. 5, 1924 |
| 2,272,886 | Wilson | Feb. 10, 1942 |
| 2,520,560 | Paton | Aug. 29, 1950 |